United States Patent
Warner

(10) Patent No.: US 10,539,068 B2
(45) Date of Patent: Jan. 21, 2020

(54) EXHAUST PORTING APPARATUS

(71) Applicant: Mark Mcgregor Warner, Hillarys (AU)

(72) Inventor: Mark Mcgregor Warner, Hillarys (AU)

(73) Assignee: Mark Mcgregor Warner, Hillarys (AU)

( * ) Notice: Subject to any disclaimer, the term of this patent is extended or adjusted under 35 U.S.C. 154(b) by 14 days.

(21) Appl. No.: 16/069,110

(22) PCT Filed: Jan. 12, 2017

(86) PCT No.: PCT/AU2017/050018
§ 371 (c)(1),
(2) Date: Jul. 10, 2018

(87) PCT Pub. No.: WO2017/124136
PCT Pub. Date: Jul. 27, 2017

(65) Prior Publication Data
US 2019/0003378 A1      Jan. 3, 2019

(30) Foreign Application Priority Data

Jan. 19, 2016 (AU) .................................. 2016900157

(51) Int. Cl.
*F02B 37/22* (2006.01)
*F02B 37/02* (2006.01)

(52) U.S. Cl.
CPC .............. *F02B 37/22* (2013.01); *F02B 37/02* (2013.01); *F05D 2220/40* (2013.01); *F05D 2260/60* (2013.01)

(58) Field of Classification Search
CPC ...... F02B 37/22; F02B 37/02; F05D 2220/40; F05D 2260/60
See application file for complete search history.

(56) References Cited

U.S. PATENT DOCUMENTS 3,262,413 A * 7/1966 Douglas .............. B63B 35/7943
440/46
3,522,797 A * 8/1970 Stinebaugh ............... F02B 1/00
123/317

(Continued)

FOREIGN PATENT DOCUMENTS

EP       0822325 A2 *  2/1998 .......... F02B 27/0284

OTHER PUBLICATIONS

Spain, Andrew; "International Search Report"; prepared for application No. PCT/AU2017/050018; dated Feb. 20, 2017; 5 pages.

*Primary Examiner* — Patrick D Maines
(74) *Attorney, Agent, or Firm* — Winstead PC

(57) ABSTRACT

Provided is an exhaust porting apparatus (10) for a turbocharged internal combustion engine (4) which includes a turbocharger (6) that is conventionally arranged in fluid communication with the exhaust (8), the turbo in turn facilitating forced air induction back into the engine via air intake (5). The apparatus (10) comprises a housing (12) that defines an inlet port (14) and an outlet port (16). The apparatus (10) also includes a valve member 18 which is arranged within the housing (12). The valve member (18) is generally displaceable between a high-velocity gas inlet position, wherein the valve member (18) allows unobstructed fluid flow between the inlet and outlet ports (14) and (16), and a low-velocity gas inlet position, wherein the valve member (18) obstructs fluid flow through the outlet port 16 whilst allowing unobstructed fluid flow into the inlet port (14). The apparatus (10) further includes an actuator (20) which is generally configured for dynamically actuating the valve member (18) between the low- and high-velocity gas inlet positions. In this manner, when the inlet and outlet ports (14) and (16) operatively arranges the housing (12) in fluid communication with the engine's exhaust (8), dynamic actuation of the valve member (18) enables an increase in (Continued)

exhaust gas velocity via the outlet port 16 into the turbocharger (6) by means of the Venturi effect.

9 Claims, 4 Drawing Sheets

(56) References Cited

U.S. PATENT DOCUMENTS

| | | |
|---|---|---|
| 4,220,008 A | 9/1980 | Wilber et al. |
| 4,895,203 A * | 1/1990 | McLaren ............... F28D 7/024 165/156 |
| 7,428,814 B2 | 9/2008 | Pedersen et al. |
| 7,637,106 B2 | 12/2009 | Hertweck et al. |
| 8,387,385 B2 | 3/2013 | Gray, Jr. et al. |
| 2014/0144134 A1 | 5/2014 | McEwan et al. |

* cited by examiner

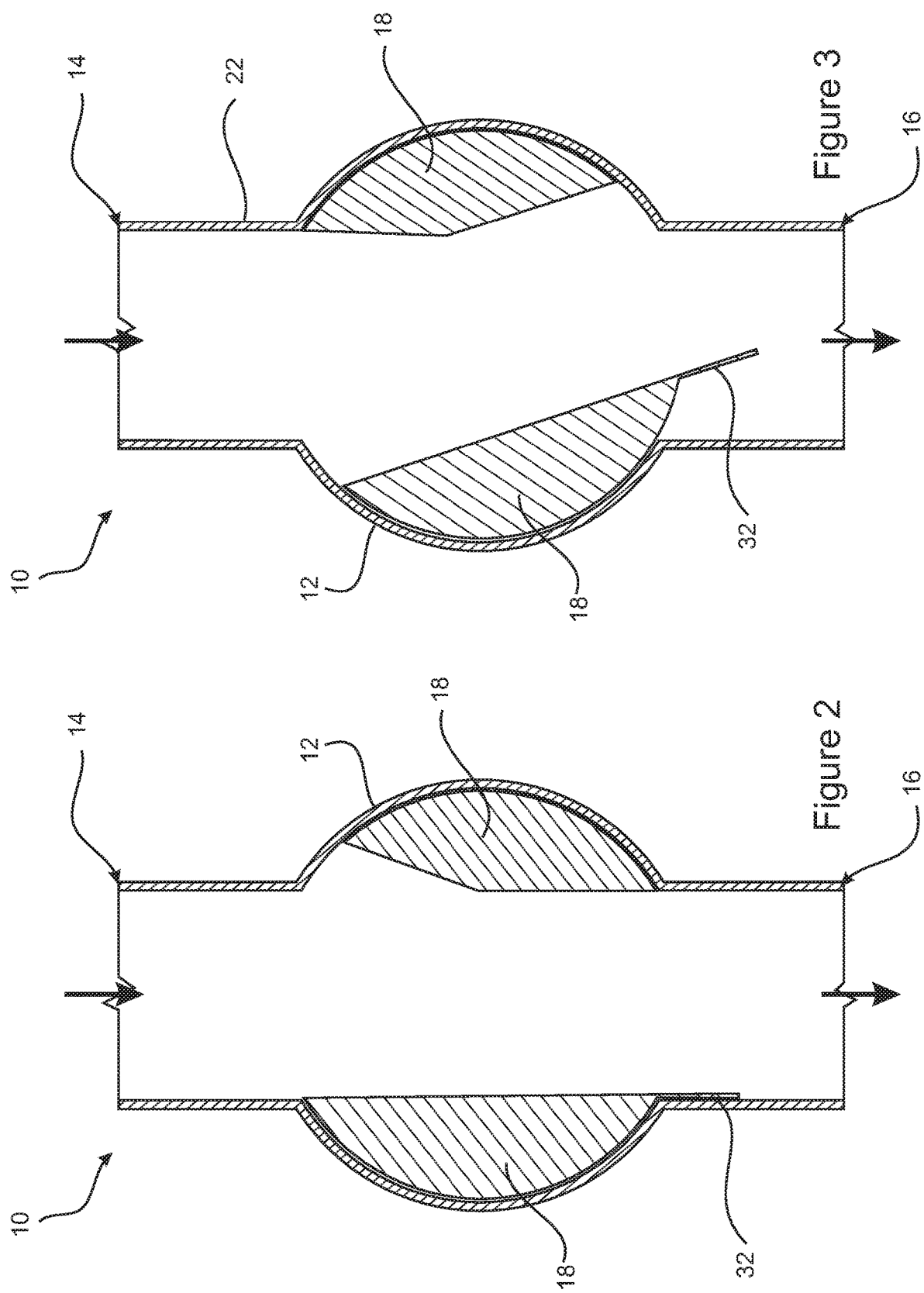

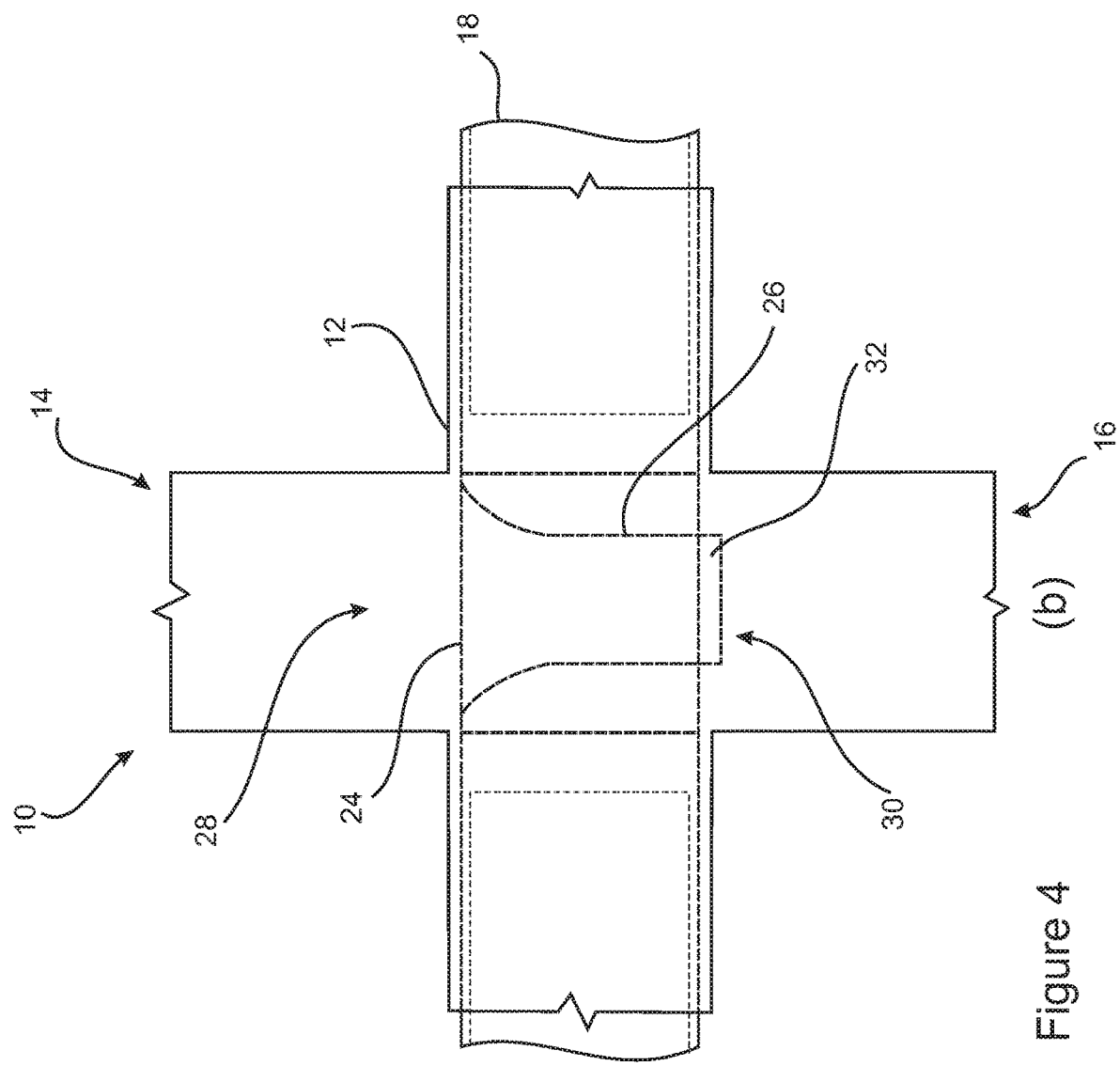
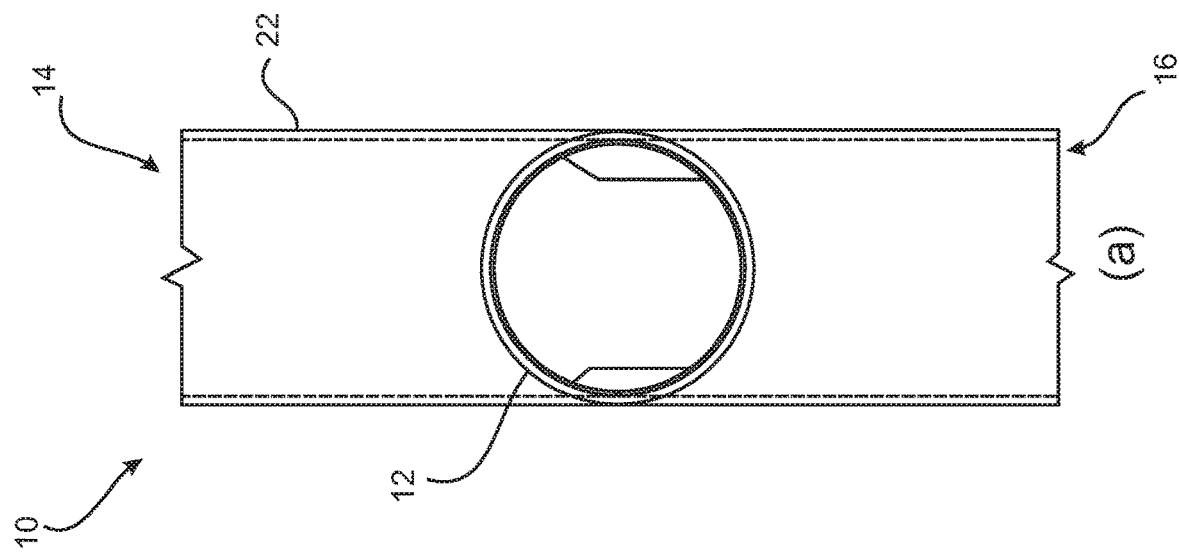
Figure 4

EXHAUST PORTING APPARATUS

TECHNICAL FIELD

This invention relates to an exhaust porting apparatus, an internal combustion engine having such a porting apparatus, and a vehicle including such an internal combustion engine.

BACKGROUND ART

The following discussion of the background art is intended to facilitate an understanding of the present invention only. The discussion is not an acknowledgement or admission that any of the material referred to is or was part of the common general knowledge as at the priority date of the application.

A turbocharger, or 'turbo' as typically known colloquially, is a turbine-driven forced induction device that increases an internal combustion engine's efficiency and power output by forcing extra air into the combustion chamber. This improvement over a naturally aspirated engine's output is due to the occurrence that the turbo can force more air, and proportionately more fuel, into the combustion chamber than atmospheric pressure alone.

A supercharger is another type of forced induction device. A key difference between a turbocharger and a conventional supercharger is that a supercharger is mechanically driven by the engine, often through a belt connected to the crankshaft, whereas a turbocharger is powered by a turbine driven by the engine's exhaust gas. Generally, a turbocharger consists of a turbine operatively driven via exhaust gas, a compressor for compressing atmospheric air fed into a combustion chamber of an engine, and a centre housing for housing the linked turbine and compressor as some manner of rotating assembly.

Compared to a mechanically driven supercharger, turbochargers tend to be more efficient, but less responsive. However, in contrast to supercharging, the primary disadvantage of turbocharging is generally what is referred to as "turbo lag" or "spool time". This is the time between the demand for an increase in power (the throttle being opened) and the turbocharger providing increased intake pressure, and hence increased power.

Throttle lag occurs because turbochargers rely on the buildup of exhaust gas pressure to drive the turbine. In variable output exhaust systems, such as automobile engines, exhaust gas pressure at idle, low engine speeds, or low throttle is usually insufficient to drive the turbine. Inertia, friction, and compressor load are the primary contributors to turbocharger lag. Superchargers do not suffer this problem, because the turbine is eliminated due to the compressor being directly powered by the engine. With a turbocharger, only once the engine reaches sufficient speed does the turbine start to spool up, or spin fast enough to produce intake pressure above atmospheric pressure.

The boost threshold of a turbocharger system is the lower bound of the region within which the compressor operates. Below a certain rate of flow, a compressor produces insignificant boost. This limits boost at a particular compressor revolutions (RPM).

A number of solutions have been proposed to address the problems associated with turbo lag and boost threshold, including twin-charging setups (having both turbocharger and supercharger on a single engine), twin-turbo arrangements, twin-scroll turbochargers, variable-geometry turbochargers, and so-called e-boosting, which relies on electrical means to bring a turbocharger up to a required speed. Other proposed solutions include a variety of pneumatic, hydraulic and/or mechanical systems. However, all of the known prior art systems are generally complex, expensive and require considerable engineering expertise to realise and operate.

The present invention seeks to propose possible solutions, at least in part, in amelioration of the known shortcomings in the art.

SUMMARY OF THE INVENTION

According to a first aspect of the invention there is provided an exhaust porting apparatus for a turbocharged internal combustion engine, said apparatus comprising:
  a housing defining an inlet port and an outlet port;
  a valve member arranged within the housing, said valve member displaceable between a high-velocity gas inlet position (wherein the valve member allows unobstructed fluid flow between the inlet and outlet ports) and a low-velocity gas inlet position (wherein the valve member obstructs fluid flow through the outlet port whilst allowing unobstructed fluid flow into the inlet port); and
  an actuator configured for dynamically actuating the valve member between the low- and high-velocity gas inlet positions;
wherein, when the inlet and outlet ports operatively arranges the housing in fluid communication with the engine's exhaust, dynamic actuation of the valve member enables an increase in exhaust gas velocity via the outlet port into the turbocharger by means of the Venturi effect.

As will be appreciated by the skilled addressee, the valve member typically only partially obstructs the outlet port in the low-velocity gas inlet position, so that exhaust gas can still pass through the apparatus, i.e. 'obstruct' should not be construed to mean 'completely block'.

In one example, the housing may comprise a substantially straight tube which defines the inlet and outlet ports at opposite ends thereof, said valve member arranged within the tube between such ends.

In one example, the valve member may comprise a solid tubular member defining a transverse conduit therethrough, the tubular member, in turn, arranged transversely to the tubular housing, so that operative rotation of the tubular valve member within the housing angles the transverse conduit between the inlet and outlet ports.

Typically, an inlet port side of the valve member's transverse conduit may be larger than an outlet port side thereof to allow obstruction of fluid flow through the outlet port whilst allowing unobstructed fluid flow into the inlet port when operatively rotated.

In one example, the inlet port side of the valve member's transverse conduit may define an elliptical frustum shape.

In one example, the outlet port side of the valve member's transverse conduit may define a cylindrical shape.

In one example, the outlet port side of the valve member's transverse conduit may include a vane configured to further obstruct fluid flow when the valve member is in the low-velocity gas inlet position.

Typically, the actuator may comprise an electromechanical, pneumatic and/or hydraulic actuator adapted to actuate the valve member.

In one example, the actuator may be configured to rotate the tubular member within the housing.

Typically, the actuator may be configured to rotate the tubular member through a range of 0° to 85°.

Preferably, the actuator may be configured to rotate the tubular member through a range of 0° to 55°.

Typically, the actuator may be configured responsive to an exhaust gas velocity sensor operatively sensing a velocity of exhaust gas entering and/or exiting the apparatus.

In another example, the actuator may be configured responsive to a sensor operatively sensing an operating characteristic of the turbocharger.

According to a second aspect of the invention there is provided a turbocharged internal combustion engine having an exhaust porting apparatus according to the first aspect of the invention.

According to a third aspect of the invention there is provided a turbocharged internal combustion engine having an exhaust porting apparatus comprising:
- a housing defining inlet and outlet ports operatively arranging the housing in fluid communication between the engine's exhaust and the turbocharger, respectively;
- a valve member arranged within the housing, said valve member displaceable between a high-velocity gas inlet position (wherein the valve member allows unobstructed fluid flow between the inlet and outlet ports) and a low-velocity gas inlet position (wherein the valve member obstructs fluid flow through the outlet port whilst allowing unobstructed fluid flow into the inlet port);
- a sensor operatively responsive to an operating characteristic of the engine; and
- an actuator arranged in signal communication with the sensor, said actuator configured for dynamically actuating the valve member between the low- and high-velocity gas inlet positions in response to a sensed operating characteristic of the engine;

wherein dynamic actuation of the valve member enables an increase in exhaust gas velocity via the outlet port into the turbocharger by means of the Venturi effect.

In one example, the housing may comprise a substantially straight tube which defines the inlet and outlet ports at opposite ends thereof.

In one example, the valve member may comprise a solid tubular member defining a transverse conduit therethrough, the tubular member, in turn, arranged transversely to the tubular housing, so that operative rotation of the tubular valve member within the housing angles the transverse conduit between the inlet and outlet ports.

Typically, an inlet port side of the valve member's transverse conduit may be larger than an outlet port side thereof to allow obstruction of fluid flow through the outlet port whilst allowing unobstructed fluid flow into the inlet port.

In one example, the inlet port side of the valve member's transverse conduit may have an elliptical frustum shape.

In one example, the outlet port side of the valve member's transverse conduit may have a cylindrical shape.

In one example, the outlet port side of the valve member's transverse conduit may include a vane configured to further obstruct fluid flow when the valve member is in the low-velocity gas inlet position.

Typically, the actuator may comprise an electromechanical, pneumatic and/or hydraulic actuator adapted to actuate the valve member.

In one example, the actuator may be configured to rotate the tubular member within the housing.

Typically, the actuator may be configured to rotate the tubular member through a range of 0° to 85°.

Preferably, the actuator may be configured to rotate the tubular member through a range of 0° to 55°.

Typically, the sensor may include an exhaust gas velocity sensor operatively sensing a velocity of exhaust gas entering and/or exiting the apparatus.

In another example, the sensor may be configured to operatively sense an operating characteristic of the turbocharger.

According to a fourth aspect of the invention there is provided a vehicle having a turbocharged internal combustion engine in accordance with the second or third aspects of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 2 is a side-sectional diagrammatic representation of one example of an exhaust porting apparatus with a valve member in a high-velocity gas inlet position;

FIG. 3 is a side-sectional diagrammatic representation of the exhaust porting apparatus of FIG. 2 with a valve member in a low-velocity gas inlet position;

FIG. 4(a) is a top-view diagrammatic representation of the exhaust porting apparatus of FIG. 2;

FIG. 4(b) is a front-sectional diagrammatic representation of the exhaust porting apparatus of FIG. 2.

In the figures, incorporated to illustrate features of an example embodiment or embodiments, like reference numerals are used to identify like parts throughout the figures.

DETAILED DESCRIPTION OF EMBODIMENTS

Figure 1:
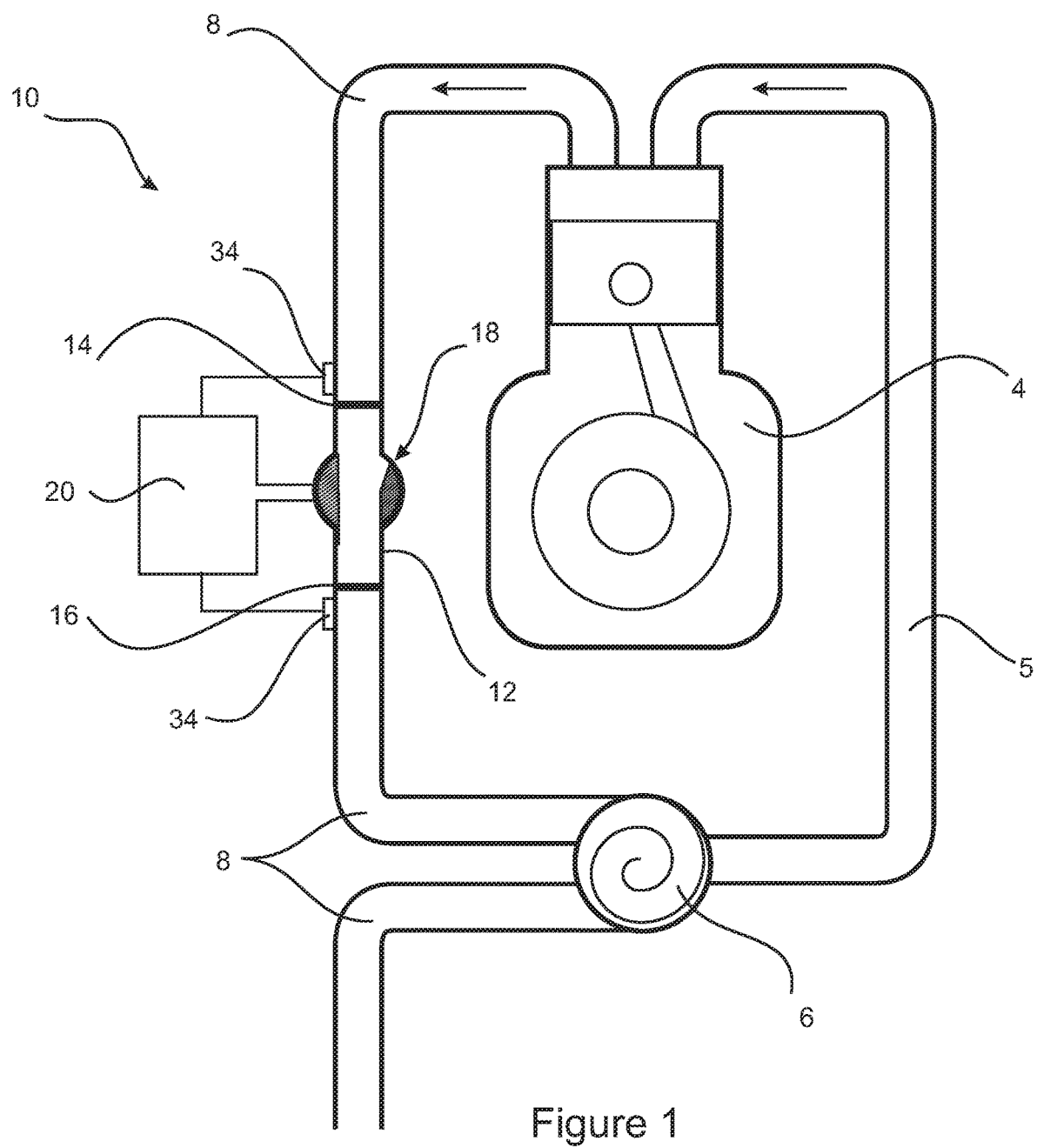
FIG. 1 is a diagrammatic representation of a turbocharged internal combustion engine arrangement having an exhaust porting apparatus in accordance with an aspect of this disclosure.
Figure 5:
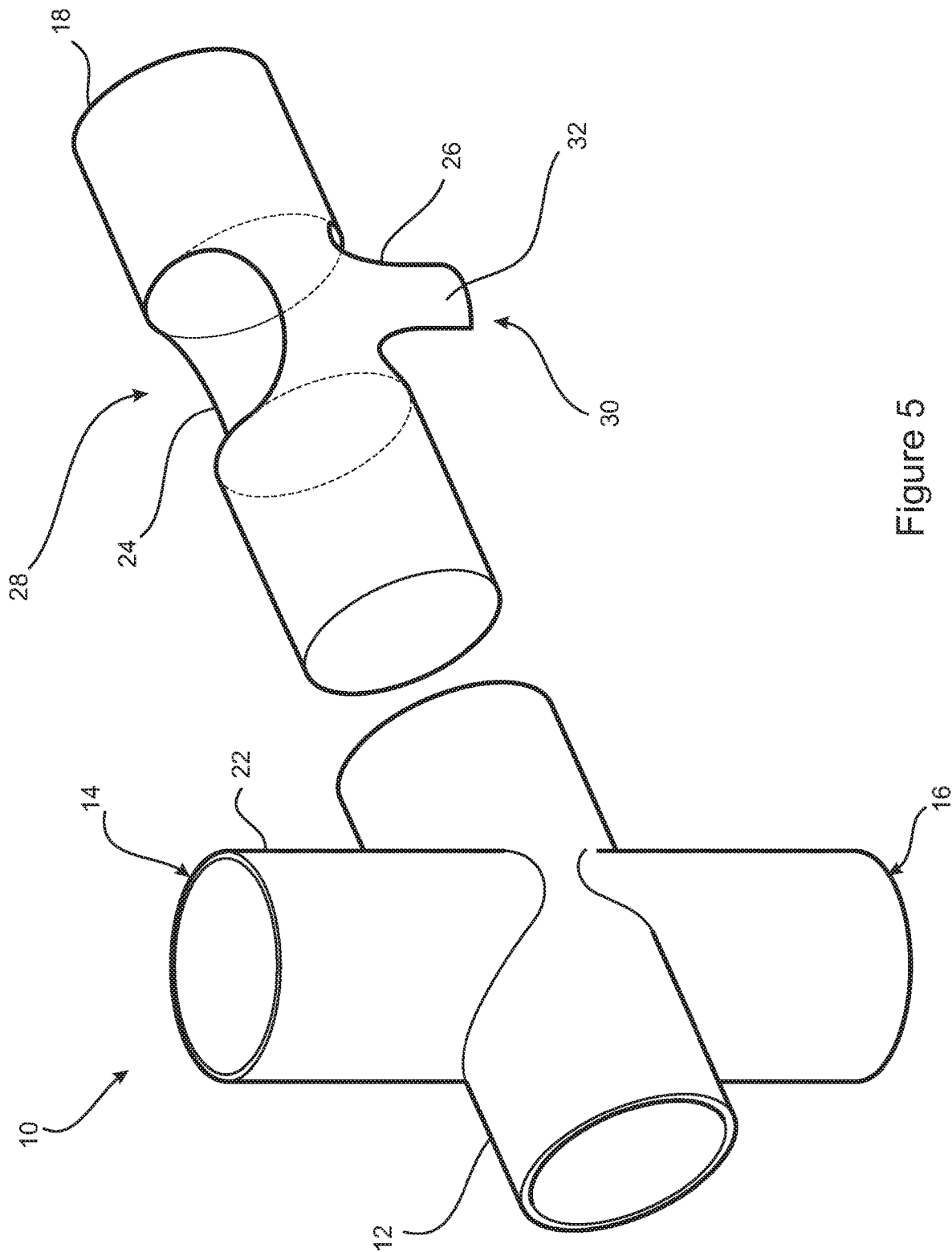
FIG. 5 is a perspective exploded-view diagrammatic representation of the exhaust porting apparatus of FIG. 2.

The following modes, given by way of example only, are described in order to provide a more precise understanding of the subject matter of a preferred embodiment or embodiments.

With reference now to the accompanying drawings, there is shown one example of an exhaust porting apparatus 10 for a turbocharged internal combustion engine 4. The engine 4 includes a turbocharger 6 that is conventionally arranged in fluid communication with the exhaust 8, the turbo in turn facilitating forced air induction back into the engine via air intake 5. Accordingly, in this disclosure, reference to fluid generally means reference to exhaust gasses exhausted by the engine 4.

Typically, the apparatus 10 comprises a housing 12 that defines an inlet port 14 and an outlet port 16. The apparatus 10 also includes a valve member 18 which is arranged within the housing 12, as shown.

The valve member 18 is generally displaceable between a high-velocity gas inlet position (shown in FIG. 3), wherein the valve member 18 allows unobstructed fluid flow between the inlet and outlet ports 14 and 16, and a low-velocity gas inlet position (shown in FIG. 2), wherein the valve member 18 obstructs fluid flow through the outlet port 16 whilst allowing unobstructed fluid flow into the inlet port 14.

The apparatus 10 further includes an actuator 20 which is generally configured for dynamically actuating the valve member 18 between the low- and high-velocity gas inlet positions. In this manner, when the inlet and outlet ports 14 and 16 operatively arranges the housing 12 in fluid communication with the engine's exhaust 8, dynamic actuation of the valve member 18 enables an increase in exhaust gas velocity via the outlet port 16 into the turbocharger 6 by means of the Venturi effect.

In this example, the housing 12 comprises a substantially straight tube 22 which defines the inlet and outlet ports 14 and 16 at opposite ends thereof, as shown. It is however to be appreciated that the housing 12 may take various forms, as will be understood by the skilled addressee.

In a preferred embodiment, the housing 12 is located as close as practically possible to an impeller and/or intake of the turbocharger 6. For example, the housing 12 may comprise a housing of the actual turbocharger 6, or the like, so that the valve member 18 is located close to an impeller of the turbocharger 6, or the like.

In one example, the valve member 18 comprises a solid tubular member 24 which defines a transverse conduit 26 therethrough. This tubular member 24, in turn, is arranged transversely to the tubular housing 22, so that operative rotation of the tubular valve member 18 within the housing 12 angles the transverse conduit 26 between the inlet and outlet ports 14 and 16.

Typically, in such an example, an inlet port side 28 of the valve member's transverse conduit 26 is larger than an outlet port side 30 thereof to allow obstruction of fluid flow through the outlet port 16 whilst allowing unobstructed fluid flow into the inlet port 14. For example, the inlet port side 28 of the valve member's transverse conduit 26 may have an elliptical frustum shape. Similarly, the outlet port side 30 of the valve member's transverse conduit 26 may have a cylindrical shape.

In a preferred example, the outlet port side 30 of the valve member's transverse conduit 26 includes a vane 32 which is configured to further obstruct fluid flow when the valve member 18 is in the low-velocity gas inlet position.

The actuator 20 may comprise any number of suitable mechanisms, including an electromechanical, pneumatic and/or hydraulic actuator which is adapted to actuate the valve member 18. In this example, the actuator 20 is configured to rotate the tubular member 24 within the housing 12, although other configurations are possible and within the scope of this disclosure.

Typically, the actuator 20 may be configured to rotate the tubular member 24 through a range of 0° to 85°. Preferably, however, the actuator 20 is configured to rotate the tubular member 24 through a range of 0° to 55°.

The actuator 20 is typically configured responsive to an exhaust gas velocity sensor 34 which operatively senses a velocity of exhaust gas entering and/or exiting the apparatus 10. In another example, the actuator 20 may alternatively, or in addition, be configured responsive to a sensor 34 operatively sensing an operating characteristic of the turbocharger 6 and/or the engine 4.

It is to be appreciated that this invention provides not only for apparatus 10, but also encompasses a turbocharged internal combustion engine 4 including apparatus 10, as well as a vehicle including such an internal combustion engine 4.

As will be understood by the skilled addressee, an operating characteristic of the turbocharger 6 and/or the engine 4 may comprise a number of different characteristics. For example, an engine load, engine revolutions, engine power output, engine temperature, instantaneous fuel consumption, and/or the like. Similarly, turbocharger operating characteristics may include impeller revolutions, instantaneous boost output, compressor load, turbo temperature, pressure input and/or output, exhaust manifold pressure, and/or the like.

It is to be appreciated that the apparatus 10 applies to all reciprocating piston, rotary or turbine engines. Similarly, such engines may be fueled by all oil-based, grain, vegetable, naturally occurring gas, processed gas, algae, or organic derived fuel sources.

Applicant believes it particularly advantageous that the present invention provides a means that may assist in keeping an impeller of a turbocharger spooled-up at lower engine revolutions, potentially reducing turbo lag and providing improved turbocharger performance in internal combustion engines.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

It is to be appreciated that reference to "one example" or "an example" of the invention is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

It is to be understood that the terminology employed above is for the purpose of description and should not be regarded as limiting. The described embodiment is intended to be illustrative of the invention, without limiting the scope thereof. The invention is capable of being practised with various modifications and additions as will readily occur to those skilled in the art.

Various substantially and specifically practical and useful exemplary embodiments of the claimed subject matter are described herein, textually and/or graphically, including the best mode, if any, known to the inventors for carrying out the claimed subject matter. Variations (e.g. modifications and/or enhancements) of one or more embodiments described herein might become apparent to those of ordinary skill in the art upon reading this application.

The inventor(s) expects skilled artisans to employ such variations as appropriate, and the inventor(s) intends for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

The use of words that indicate orientation or direction of travel is not to be considered limiting. Thus, words such as "front", "back", "rear", "side", "up", "down", "upper", "lower", "top", "bottom", "forwards", "backwards", "towards", "distal", "proximal", "in", "out" and synonyms, antonyms and derivatives thereof have been selected for convenience only, unless the context indicates otherwise. The inventor(s) envisage that various exemplary embodiments of the claimed subject matter can be supplied in any particular orientation and the claimed subject matter is intended to include such orientations.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values there between, such as for example, 1.1, 2.5, 3.335, 5, 6.179, 8.9999, etc., and includes all sub-ranges there between, such as for example, 1 to 3.65, 2.8 to 8.14, 1.93 to 9, etc.

Accordingly, every portion (e.g., title, field, background, summary, description, abstract, drawing figure, etc.) of this application, other than the claims themselves, is to be regarded as illustrative in nature, and not as restrictive; and the scope of subject matter protected by any patent that issues based on this application is defined only by the claims of that patent.

The invention claimed is:

1. An exhaust porting apparatus for a turbocharged internal combustion engine, said apparatus comprising:
   a housing comprising a tube defining an inlet port and an outlet port at opposite ends thereof;
   a valve member arranged within the tube between said ports, said valve member displaceable between a high-velocity gas inlet position (wherein the valve member allows unobstructed fluid flow between the inlet and outlet ports) and a low-velocity gas inlet position (wherein the valve member obstructs fluid flow through the outlet port whilst allowing unobstructed fluid flow into the inlet port), the valve member comprising a solid tubular member defining a transverse conduit therethrough, the tubular member, in turn, arranged transversely to the tubular housing, so that operative rotation of the tubular valve member within the housing angles the transverse conduit between the inlet and outlet ports, wherein an inlet port side of the valve member's transverse conduit is larger than an outlet port side thereof to allow obstruction of fluid flow through the outlet port whilst allowing unobstructed fluid flow into the inlet port when operatively rotated; and
   an actuator configured for dynamically actuating the valve member between the low- and high-velocity gas inlet positions by rotating the tubular member through a range of 0° to 55°;
   wherein, when the inlet and outlet ports operatively arrange the housing in fluid communication with the engine's exhaust, dynamic actuation of the valve member enables an increase in exhaust gas velocity via the outlet port into the turbocharger by means of the Venturi effect in order to minimise turbocharger lag at low engine revolutions.

2. The apparatus of claim 1, wherein the inlet port side of the valve member's transverse conduit defines an elliptical frustum shape.

3. The apparatus of claim 1, wherein the outlet port side of the valve member's transverse conduit defines a cylindrical shape.

4. The apparatus of any of claim 1, wherein the outlet port side of the valve member's transverse conduit includes a vane configured to further obstruct fluid flow when the valve member is in the low-velocity gas inlet position.

5. The apparatus of claim 1, wherein the actuator comprises an electromechanical, pneumatic and/or hydraulic actuator adapted to actuate the valve member.

6. A vehicle having a turbocharged internal combustion engine in accordance with claim 5.

7. The apparatus of claim 1, wherein the actuator is configured responsive to an exhaust gas velocity sensor operatively sensing a velocity of exhaust gas entering and/or exiting the apparatus.

8. The apparatus of claim 1, wherein the actuator is configured responsive to a sensor operatively sensing an operating characteristic of the turbocharger.

9. A turbocharged internal combustion engine having an exhaust porting apparatus according to claim 1.

* * * * *